July 10, 1928.                     W. S. SMITH                    1,676,295
                                     SCALE
                            Filed May 12, 1926            2 Sheets-Sheet 1
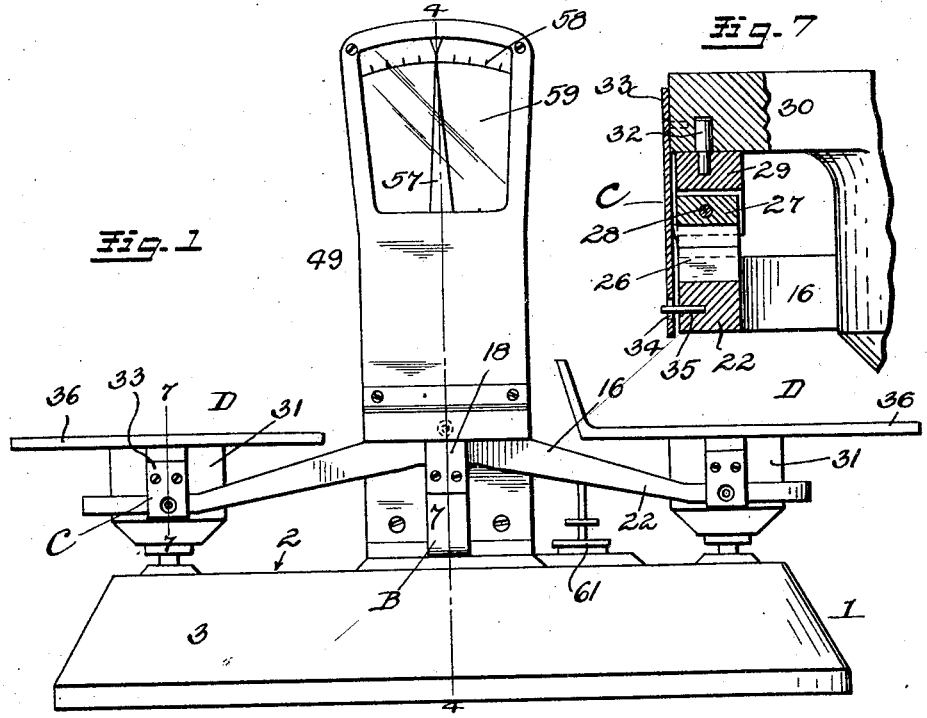
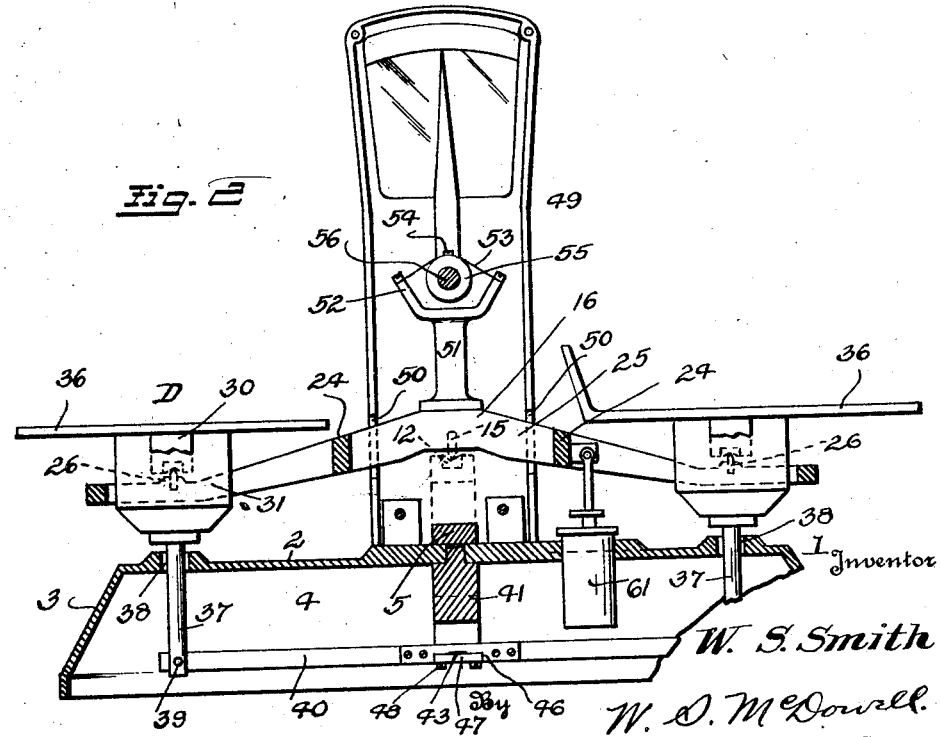

July 10, 1928.
W. S. SMITH
SCALE
Filed May 12, 1926 2 Sheets-Sheet 2
1,676,295
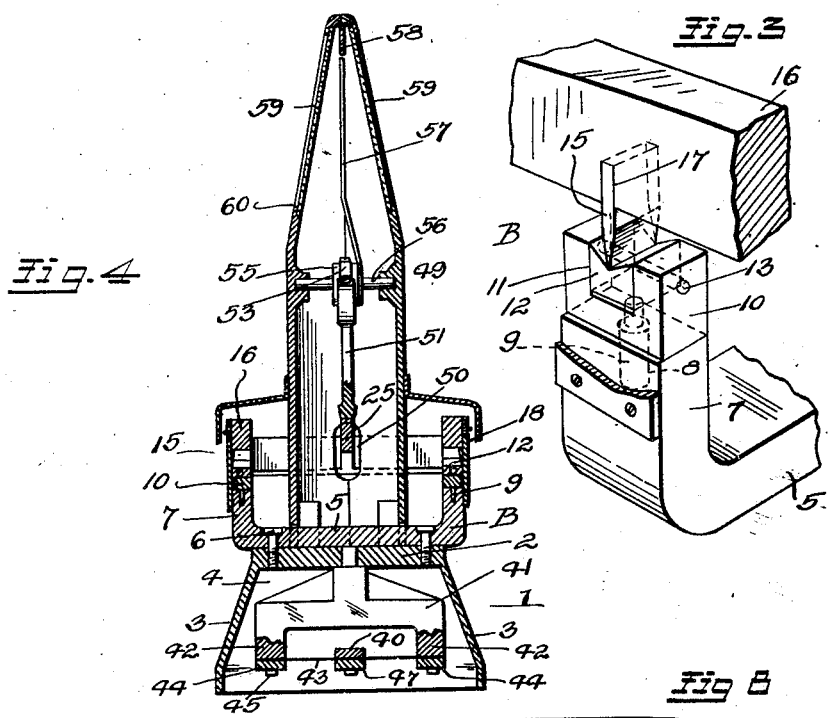
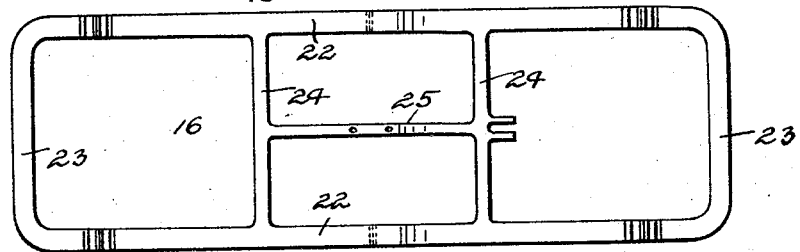
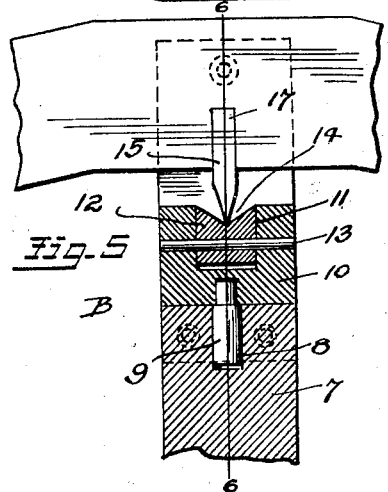
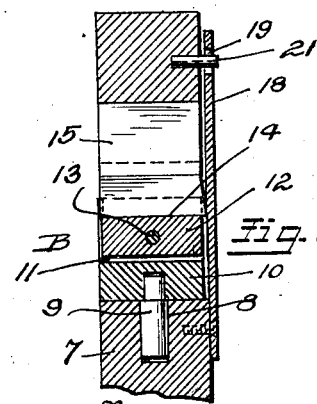
Inventor
W. S. Smith
By W. D. McDowell
Attorney Patented July 10, 1928.

1,676,295

UNITED STATES PATENT OFFICE.

WALTER S. SMITH, OF COLUMBUS, OHIO.

SCALE.

Application filed May 12, 1926. Serial No. 108,671.

This invention relates to improvements in scales and is particularly directed to scales of the so called even balance type wherein a centrally pivoted beam is provided with weight receivers mounted on its outer ends and wherein a torsion element is provided for resisting deflection of the beam from other than a balanced or neutral position. As an example of a scale of this type reference is made to my prior patent issued February 7, 1922, Number 1,405,634, wherein the torsion element referred to is disclosed as being associated with the indicator structure for denoting by multiplied movement the weighing positions of the beam. The present invention has for an object the provision of a scale of this type having similar operating characteristics, such as sensitiveness to applied weights; freedom from error producing friction in the movable parts of the scale; the elimination of a true and level operating plane or varying comparative conditions, but wherein the torsion element is mounted in connection with the brace or check rod structure, instead of the indicator mechanism, as in my aforesaid patent, whereby several outstanding advantages are obtained, to-wit: more stable operation of the beam, the use of larger and more substantially constructed torsion elements and particularly in economy and facility in manufacture.

Another outstanding object of the present invention resides in the construction of the knife edge fulcrum supports for the beam and weight recesses, wherein said supports are each formed to include compound pivoted axes arranged in substantially perpendicular relative order so that the supports will automatically adapt and align themselves with the position of the cooperative knife edge studs or trunnions, whereby through the employment of the supports the friction due to the improper seating of the trunnions in the supports is eliminated and tolerances in manufacture provided which contributes materially toward economy in the commercial production of the scale.

With these and other objects in view, as will appear as the description proceeds, the invention consists in the novel features of construction, combinations of elements and arrangements of parts hereinafter to be fully described and pointed out in the appended claims.

In the accompanying drawings:

Figure 1 is a side elevation of the improved scale comprising the present invention, Figure 2 is a vertical sectional view taken therethrough, Figure 3 is a detail perspective view showing the compound fulcrum support for the beam bearings, Figure 4 is a detail vertical cross-sectional view on the line 4—4 of Figure 1, Figure 5 is a vertical sectional view taken through one of the fulcrum supports, Figure 6 is a similar view on the line 6—6 of Figure 5, Figure 7 is a detail vertical sectional view on the line 7—7 of Figure 1, Figure 8 is a plan view of the weighing beam or lever.

Referring more particularly to the structural details of the scale, as such details are organized in the specific form of the invention herein selected for purposes of the present disclosure, the numeral 1 designates the metallic base of the scale. This base may be in the form of a casting or stamping, as desired, and includes a substantially horizontal top wall 2, together with outwardly sloping side walls 3. The bottom of the housing is preferably open and the walls 2 and 3 serve to define an internal chamber 4, in which certain of the operating parts of the scale, to be hereinafter described, are situated.

Arranged upon the top wall 2, adjacent to the center of the base 1, is a transversely disposed fulcrum support which is designated in its entirety by the letter B which, in this instance, partakes of the form of a U shaped yoke, comprising a horizontally extending portion 5 which is screwed or otherwise secured to the base 1 as at 6, for convenience in assembly and manufacture. The upwardly directed legs 7 of the support B are provided with vertically disposed sockets 8, in which are received vertical pivots or studs 9 depending from block holders 10, which are of metallic construction and are adaptable for rotation about the vertical axes provided by the studs 9. As shown in Figures 5 and 6, the lower surfaces of the holders 10 are smoothly finished to rest upon the correspondingly finished surfaces provided upon the extreme upper end of the legs 7, whereby a proper fitting and operating relationship is maintained between the legs 7 and the holders 10 to allow the latter to turn freely upon the upper ends of said legs. The holders 10, are, in turn, provided with recesses 11 in the upper portions thereof for the reception of seal fulcrum blocks 12 and the blocks 12 are provided with horizontally disposed openings arranged to register with similar openings provided in the holders 10 for the reception of a transversely extending pin 13 for each support, which pin extends perpendicularly to the corresponding stud 9, whereby each of the fulcrum blocks include a compound pivotal mounting permitting each block to turn about both vertical and horizontal pivots. Each block 12 has its upper face provided with a V shaped notch 14 for the reception of the transversely extending knife edge trunnion 15 provided in connection with the medial portions of a weighing beam or lever 16. The trunnions 15 are rigidly positioned within slots 17 formed in the beam 16. It frequently happens in scale manufacture that the trunnion, which projects rigidly and in a horizontal and lateral direction from each side of the beam, are not in true alignment, or if in such alignment the receiving blocks therefor may be slightly offset from desired positions, and for this reason the vertical pivots 9 are provided in each of the fulcrum supports so as to adapt the latter automatically to these irregularities which inevitably appear in scale manufacture. On the other hand if the trunnions have the knife edges thereof disposed in other than a true horizontal plane, the pins 13 are provided to allow the blocks 12 to swing in a vertical plane and to thereby properly and automatically seat the knife edges on their supporting bearings. By this construction scales may be produced in quantity production and yet high accuracy standards maintained, and, furthermore, the construction assures a flexible mounting, as it were, for the beam which prevents binding thereof in any of its weighing positions. If desired, the outer walls of the legs 7 may have fastened thereto plates 18 which extend upwardly and are provided with enlarged openings 19, adjacent to their upper ends, for the reception of pins 21 protruding laterally from the side of the beam 16. The plates 18 serve to confine the trunnions 15 upon the blocks 12 so as to overcome lateral shifting movement thereof beyond predetermined limits and, also, the plates serve to prevent undue vertical movement on the part of the trunnions 15 and the beam 16 with regard to the bearing blocks. A limited vertical movement is permitted so as to provide for the necessary flexibility in operation and the swinging movement within normal limits of the beam, but the connection serves to overcome excess or abnormal movement.

The beam is of the substantially rectangular form, disclosed in Figure 8 and includes longitudinally extending parallel bars 22, united by the end bars 23 on the transversely extending webs 24. The webs 24 are also joined with a longitudinally extending bar 25 lying between the bars 22.

Adjacent to the outer end of the beam the bars 22 are provided in the upper surfaces thereof with slots for the reception of upstanding rigidly positioned knife edges 26, which are adapted to engage with fulcrum blocks 27, shown particularly in Figure 7 and which corresponds in construction and operation to the adjustable fulcrum B heretofore described. The blocks 27 are carried in connection with fulcrums C carried or pivotally connecting the weight receiver D with the end of the beam. As shown, however, the blocks 27 are pivotally united by means of horizontally extending pins 28 with block holders 29, which are positioned between the blocks 27 and offset projections 30 formed on the body portions 31 of the weight receivers D. The holders 29 are provided with upwardly projecting vertically arranged pins 32, which are received within sockets provided in the projections 30, the pins 32 allowing the holders 29 to turn about vertical axes so that the compound pivotal construction is provided by which the knife edges 26 and the fulcrums therefor are self adaptable to irregularities in alignment and other manufacturing era. The projections 30 may be provided with the tie plates 33, which correspond to the plates 18 in function and purpose. The lower ends of the plates 33 are provided with enlarged openings 34 for the reception of pins 35 projecting from the beam. The plates 33 serve to prevent complete separation between the knife edges 26 and the fulcrum blocks 27 but allow for ordinary, normal operating movement.

The weight receivers may be of any desired configuration depending upon the purpose and the nature of the body to be placed thereon. In this instance the weight receivers have been shown as provided with enlarged weight receiving pans 36, arranged above the body portions 31, and depending from said body portions are rigidly connected stems 37, which pass through openings 38 formed in the top wall 2 of the base 1. The stems 37 are normally positioned in the chamber 4 of the base 1 and have their lower ends pivotally connected as at 39 with a longitudinally extending check rod 40, which extends parallel to the beam 16 and is pivotally mounted in registration therewith so as to complete the weighing parallelogram lying within the chamber 4 and depending from the top wall 2 thereof at a position midway of the length of said chamber is a fixed stirrup 41 which, has its lower end formed to include spaced depending legs 42 which terminate in smooth horizontal walls for the reception of the ends of a transversely extending torsion strip 43. The ends of the strip are clamped to the legs 42 by means of clamping plates 44 which are screwed or otherwise secured to the legs 42 by the use of fastening elements 45, the arrangement being such as to hold rigidly and firmly the ends of the strip 43 so as to restrain the latter in a positive manner against movement. Between the legs 42 the central portion of the check rod 40 is situated and, in the present instance, the check rod is recessed as at 46 for the reception of the transversely extending torsion strip and is rigidly clamped to said strip by means of clamping plates 47, held in the recesses 46 by screws or the like 48. Thus it will be apparent that, should the scale elements be moved out of their normal or neutral position, the torsion strip 43 will be distorted and placed under stress because of the oscillatory movement of the check rod structure with which it is clamped adjacent to its central portion.

Arising from the central portion of the base is a two part indicator housing 49, commonly termed the indicator tower. The central longitudinally extending bar portion 25 of the beam is movably positioned within this tower by extending through elongated openings 50 provided in the sides thereof, as shown in Figure 4. Upon the central portion of the bar 25 there is fixed an upwardly extending stirrup 51 provided with an upper yoke shaped extremity 52. Connected with the end of this extremity is a band 53 which is arranged to pass over and is secured to, as at 54, a drum 55, carried in connection with a transversely extending shaft 56. Connected with the drum is an upwardly directed indicator hand 57, which is arranged for movement upon the graduated surface 58 provided in the upper part of the tower 49. This surface and the top of the indicator hand is viewable from either side of the scale by means of transparent panels 59 arranged in openings 60 formed in the side walls of the tower. Normally, the torsion element 43 serves to maintain the beam and its associated indicator hand 57 in a normal or neutral position wherein said hand occupies a central position with respect to the graduated surface 58, so that the deflection of the beam from its normal position may be observed to indicate both under and over weights. By spacing the drum shaft 56 from the fulcrum support B of the beam the movement of the hand 57 may be multiplied as regards the increments of travel of said beam to any suitable extent in order to provide for conveniency and accuracy in the reading of the scale.

A dash pot 61 is connected, as usual, with the beam to stabilize its oscillation following the removal or application of weights to the beam, and if desired an adjustable poise may be utilized, of conventional design, to further control the beam balance. In the process of manufacturing the beam, I preferably mill or cut the central recesses or slots 17 for the reception of the trunnions 15, both slots being produced by the single transverse cut, and, while the beam is supported on a permanent base, the slots in one end of the beam for the knife edges 26 are produced, and then by turning the beam through 180 degrees the opposite ends thereof can be presented to the cutter to produce the other set of slots in the opposite end of the beam for the reception of the knife edges. This method assures, without laying out distances, an exact spacing of the outer slots at positions located equidistantly from the central slot and overcomes a source of inaccuracy and error heretofore present in the manufacture of scales of this kind. Similarly, in forming the knife edges on the trunnions, the plate comprising said trunnions are arranged in compact groups in a holder and presented to a grinding tool to bevel one side thereof. Then, by turning the holder, the opposite edges of the plate are similarly presented to the grinder so that when the latter finishes its operation, each plate will be perfectly beveled on opposite sides so that its edge will occupy the exact center of the thickness of each plate, instead of being located to one side or the other of such center.

It will be seen that the present invention provides a scale of the even balanced type which, as previously stated, lends itself readily to economical yet accurate and durable manufacture. This is obtained by the features of construction and manufacture above set forth, including especially the compound pivotal bearings for the beam knife edge trunnions by which the almost imperceptible errors in alignment and arrangement are compensated for and overcome without involving friction or binding of movable parts. I consider this pivotal bearing construction to be of very considerable importance in not only scales of the type herein disclosed but in scales of any kind employing pivot or knife edge fulcrums arranged in aligning order. Again, the durability and ruggedness of the scale is considerably benefitted by arranging the torsion strip in connection with the check structure of the scale, in that a large strip may be used fully capable of standing repeated operations without fatiguing on the part of the metal comprising the strip or loss of its original form. Moreover, the position of the strip removes it from the normal shock and jar of the scale and contributes materially to its accuracy and longevity. It will be observed that the torsion strip functions in the manner of a pension dulum in returning the beam to a neutral position, but it is an improvement on the pendulum principle in that the scale is not responsive to variation in level and may be placed on any supporting base, and will function normally irrespective of the relation of the supporting surface of the base with respect to the horizontal.

What is claimed is:

1. A scale comprising a pivoted beam, a check rod movable in parallelism with said beam, a torsion strip cooperative with said check rod to maintain said beam normally in neutral position, an indicator tower arranged above said beam, a rotatable member mounted in said tower, a yoke rigidly carried by the central portion of said beam and including spaced arms arranged on opposite sides of said member, a flexible member having its ends connected with said arm and its central portion operatively engaging said rotatable member, and an indicator hand movable with said member and having its outer end arranged to travel adjacent to a graduated surface.

2. A scale comprising a pivoted beam, a tower arising from said beam, a stirrup fixed to the central portion of said beam and arranged to oscillate with the latter within said tower, a rotatable member mounted within said tower and disposed between the diverging portions of said stirrup, a flexible band having the ends thereof connected with the diverging portions of said stirrup and the central portion thereof connected with said rotatable member, and an indicator hand connected with said member and arranged for oscillation within said tower.

3. In a scale, a torsion strip, a pivoted beam normally maintained in a neutral position by said strip, a stirrup fixed to said beam to oscillate therewith and including upwardly diverging arms, an independently mounted rotatable member arranged above said beam and situated between the diverging arms of said stirrup, a band connection between the diverging arms of said stirrup and said rotatable member, and an indicator hand movable with said rotatable member.

4. In a scale, a base, a beam, a pivotal connection between the beam and the base comprising a U shaped support, a pair of vertically disposed holders arranged on the upper surfaces of said support, vertically disposed pivotal connections between said holders and said supports permitting the holders to turn in a horizontal plane, said holders having the upper portions thereof provided with recesses, fulcrum blocks arranged to occupy said recesses, horizontally disposed pivotal connections mounting said blocks within said recesses to permit of vertical oscillation of said blocks, and a pair of fixed knife edge trunnions projecting laterally from said beam and engaging in V shaped notches provided in the upper surfaces of said blocks.

5. In a scale, a fulcrum support comprising a base, a holder, a vertical pivotal connection between said holder and base permitting the holder to turn in a horizontal plane, said holder having a recess provided therein, a block positioned within the recess of said holder, a horizontal pivotal connection between said holder and said block permitting the latter to swing in a vertical plane, and a movable member provided with a fixed laterally extending knife edge trunnion engaged with a V shaped notch provided in said block.

6. In a scale, a base, a fulcrum support associated with said base comprising a holder, a vertical pivotal connection between said holder and said base permitting the holder to turn in a horizontal plane, said holder being provided with a recess, a block positioned within said recess, a horizontally arranged pivotal connection uniting said block with said holder and permitting the block to turn in a substantially vertical plane, a movable member provided with a fixed laterally projecting trunnion having seated engagement with a V shaped notch provided in said block, and a tie plate connected with said base and having a loose connection with said movable member, said tie plate serving to confine the trunnion within the notch of said block.

7. In a scale, a base, a beam pivotally mounted on said base, said beam being formed to comprise longitudinally extending side bars, transversely extending connecting webs, and a centrally located longitudinally extending web connected with said transverse webs, a stirrup arising from said central web, and an indicating mechanism actuated by said stirrup.

8. In a scale, a base, a beam, a pivotal connection between the beam and the base comprising a U shaped support formed with bearings in the upper ends thereof for the reception of vertically disposed pins, U shaped holders mounted on said pins permitting said holders to turn in a horizontal plane, fulcrum blocks arranged within said holders, horizontally disposed pivotal connections uniting said blocks with said holders and permitting the blocks to turn in a vertical plane, and laterally extending knife edge trunnions fixed to said beam and engaging with V shaped notches provided in said blocks.

9. In a scale, a base, a beam, a pair of transversely arranged trunnions projecting laterally from said beam, a pair of fulcrum blocks for the reception of said trunnions, said blocks being positioned for vertical oscillation upon horizontally turning mountings having vertically disposed pivotal connection with said base.

10. In a scale, a base, a beam, a pair of transversely arranged trunnions projecting laterally from said beam, seats for the reception of said trunnions mounted for vertical oscillation upon horizontally turning mountings having vertically disposed pivotal connections with said base.

In testimony whereof I affix my signature.

WALTER S. SMITH.